United States Patent
Aura

(10) Patent No.: US 6,220,135 B1
(45) Date of Patent: Apr. 24, 2001

(54) ARRANGEMENT IN CONNECTION WITH A FIBRE PROCESS

(75) Inventor: Kimmo Aura, Klaukkala (FI)

(73) Assignee: Nextrom Holding S.A. (CH)

( * ) Notice: Subject to any disclaimer, the term of this patent is extended or adjusted under 35 U.S.C. 154(b) by 0 days.

(21) Appl. No.: 09/319,184

(22) PCT Filed: Dec. 1, 1997

(86) PCT No.: PCT/FI97/00740

§ 371 Date: Jul. 16, 1999

§ 102(e) Date: Jul. 16, 1999

(87) PCT Pub. No.: WO98/24731

PCT Pub. Date: Jun. 11, 1998

(30) Foreign Application Priority Data

Dec. 2, 1996 (FI) .......................................... 964813

(51) Int. Cl.⁷ .................................................. B26D 1/56
(52) U.S. Cl. .............................. 83/334; 83/913; 83/663; 83/950
(58) Field of Search .............................. 83/950, 913, 591, 83/597, 334, 909, 663, 674; 225/103, 63

(56) References Cited

U.S. PATENT DOCUMENTS

| | | | |
|---|---|---|---|
| 3,424,046 | * 1/1969 | Trautmann | 83/597 |
| 3,601,296 | * 8/1971 | Pick | 225/103 |
| 3,901,015 | * 8/1975 | Sangalli et al. | 83/913 |
| 3,978,751 | * 9/1976 | Farmer et al. | 83/913 |
| 4,023,723 | * 5/1977 | Dammig | 225/97 |
| 4,345,355 | * 8/1982 | Berchoux et al. | 83/913 |
| 4,538,490 | * 9/1985 | Becker | 83/913 |
| 4,630,515 | * 12/1986 | Spaller | 83/913 |
| 5,163,348 | * 11/1992 | Kitada et al. | 83/913 |
| 5,773,745 | * 6/1998 | Widmer | 83/950 |
| 5,878,464 | * 3/1999 | White | 83/913 |
| 5,979,284 | * 11/1999 | Granger | 83/334 |

FOREIGN PATENT DOCUMENTS 0 010 782   5/1980 (EP) .

* cited by examiner

Primary Examiner—Kenneth E. Peterson
Assistant Examiner—Omar Flores-Sánchez
(74) Attorney, Agent, or Firm—Nixon & Vanderhye P.C.

(57) ABSTRACT

The invention relates to an arrangement in connection with a fiber process, the arrangement being provided with a control and drawing device for guiding a fiber or the like along a desired course, and with a cutting device for cutting the fiber or the like at a moment dependent on the fiber process. For controlled operation, the cutting device comprise a body of revolution consisting of two parts between which the fiber or the like is arranged to pass during the process without that it comes in contact with the parts. The body of revolution is arranged to rotate during the cutting of the fiber or the like about an axis that is essentially transverse to the travel direction of the fiber. The edge of one part of the body of revolution is rendered so sharp that as the rotating motion of the body of revolution makes the edge press against the fiber or the like, the edge cuts the fiber, whereby the free end of the fiber or the like winds round the rotating body of revolution.

5 Claims, 1 Drawing Sheet

ARRANGEMENT IN CONNECTION WITH A FIBRE PROCESS

TECHNICAL FIELD

The invention relates to an arrangement in connection with a fibre process, the arrangement being provided with control and drawing means for guiding a fibre or the like along a desired course, and with cutting means for cutting the fibre or the like at a moment dependent on the fibre process.

BACKGROUND

Arrangements like this are today known particularly in connection with methods of cabling optical fibres, in which the setting times in connection with a change of product are to be rendered as short as possible. The previously known solutions are based on arrangements in which the fibres are arranged to pass through a drawing apparatus, and a cutting apparatus cutting the fibre at a desired moment is connected to the drawing apparatus, more particularly after the drawing apparatus in the travel direction of fibre.

A drawback of the previously known solutions is that, for example, after the cutting the free head of the fibre runs, as it were, from the drawing means, for example to a waste receptacle, whereby fibre is wasted until the fibre line has been stopped. The amount of wasted fibre can be quite large, for line speeds can be hundreds of meters a minute. Further, the solutions are sometimes complicated, for particularly at high speeds it can be difficult to control the free head of the fibre and guide it to the waste receptacle.

SUMMARY OF THE INVENTION

The object of the invention is to provide an arrangement by which the drawbacks of the prior art can be eliminated. The object is achieved with the arrangement of the invention, which is characterized in that the cutting means comprise a body of revolution consisting of two parts between which the fibre or the like is arranged to pass during the process without that it comes in contact with the parts; that the body of revolution is arranged to rotate during the cutting of the fibre or the like about an axis that is essentially transverse to the travel direction of the fibre; that the edge of one part of the body of revolution is rendered so sharp that when the rotating motion of the body of revolution makes the edge press against the fibre or the like, the edge cuts the fibre; and that the free end of the fibre or the like is arranged to wind round the rotating body of revolution.

The main advantage of the invention is that the fibre can be cut in the middle of the process so that no fibre loss occurs. In mechanical proof testing, for example, the invention makes it possible to catch the free end of the fibre during deceleration. Another advantage is that the arrangement is not in contact with the fibres during the process, and that the fibres are cut, the free end is caught and the fibre line is driven down in one step. Yet another advantage of the invention is its simplicity, as a result of which it is cost-effective to use and introduce into use.

In the following the invention will be described in greater detail with reference to preferred embodiments illustrated in the attached drawings.

DETAILED DESCRIPTION OF THE DRAWINGS

Figure 1:
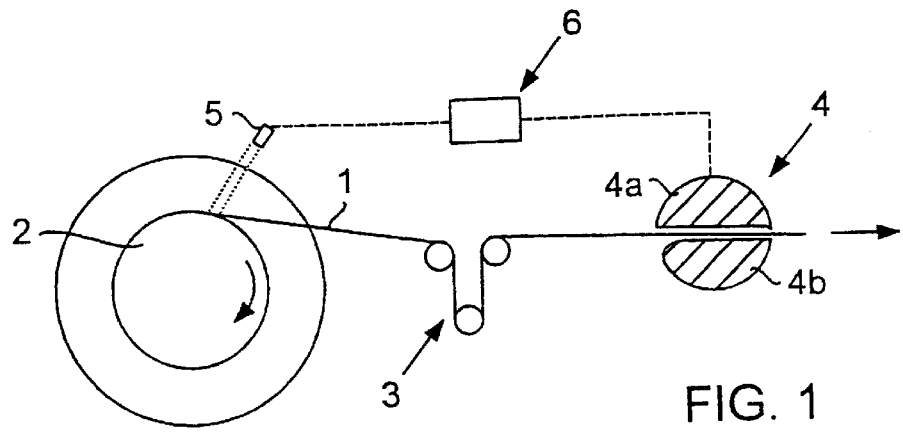
FIG. 1 shows a general side view of an arrangement according to the invention.

FIG. 1 is a general view of an arrangement according to the invention. Reference number 1 indicates a fibre or the like, for example an optical fibre, a fibre bundle, or some other such element. Reference number 2 indicates a reel from which fibre or the like is wound off to a fibre process, for example, to a secondary coating process, dyeing process, mechanical testing, or to some other process. Reference number 3 indicates an accumulator by which tension affecting the fibre or the like 1 is controlled. Reference number 4 indicates the essential means of the arrangement according to the invention, i.e. cutting means or device by which the fibre or the like is cut and by which the free end of the fibre or the like 1 is caught. Reference number 5 in FIG. 1 generally indicates a probe by which the speed of the fibre or the like 1 is monitored. The probe 5 can be, for example, an ultrasonic probe. Reference number 6 in FIG. 1 generally indicates means used to rotate means 4 and to control the speed of rotation.

Figure 2:
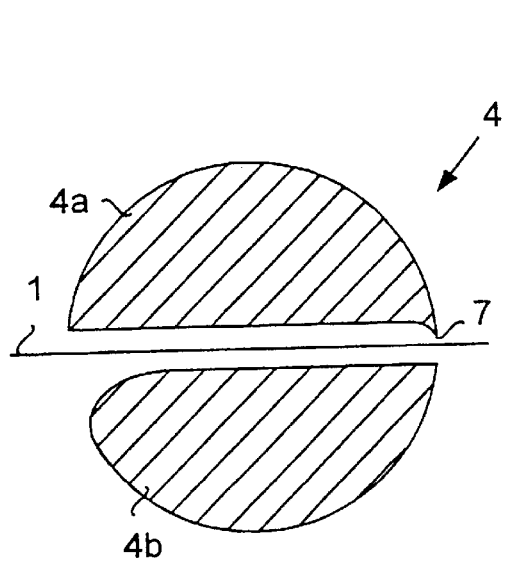
FIG. 2 shows an essential element of the arrangement according to the invention in a standard situation.

According to the essential idea of the invention, the cutting means 4 comprise a body of revolution consisting of two parts 4a, 4b between which a fibre or the like 1 is arranged to pass during the process without coming in contact with the parts. When the fibre or the like 1 is cut, the body of revolution is arranged to rotate about an axis that is essentially transverse to the travel direction of the fibre. The fibre or the like 1 needs to be cut, for example, when it is to be dyed with a different dye. An edge 7 of one part 4a of the body of revolution is rendered so sharp that when the rotating motion of the body of revolution makes the edge press against the fibre or the like 1, the edge cuts the fibre. The free end of the fibre 1 or the like winds round the rotating body of revolution, whereby it simultaneously adheres to it. This is apparent from FIGS. 2 and 3, which show an enlarged view of the cutting means 4 of FIG. 1. FIG. 2 describes the cutting means 4 during the process. It should be noted that during the process the fibre 1 or the like is not at any point in contact with the cutting means. When the fibre or the like is to be cut, the cutting means is rotated in the manner shown in FIG. 3, whereby the edge 7 cuts the fibre, and the free end of the fibre winds round the rotating body of revolution, so that the free end can be caught in a controlled manner for deceleration of the line.

As regards the rotation of the cutting means 4, the idea is that the body of revolution is accelerated as quickly as possible to a speed of rotation at which the speed of the outer surface of the body of revolution corresponds to the speed of motion of the fibre or the like 1. After this, the body of revolution is then decelerated for stopping so that the tension acting in the fibre or the like does not exceed any tension limits. Any variation of tension occurring as the fibre or the like is cut and the free end is held fast is controlled e.g. by means of the accumulator 3. The body of revolution can be rotated by means of any suitable power source, such as an electric motor, pneumatic apparatus, spring force, etc. The speed of the fibre can be monitored by a suitable means, such as an ultrasonic probe 5, so as to generate design values for the use of the cutting means.

Figure 3:
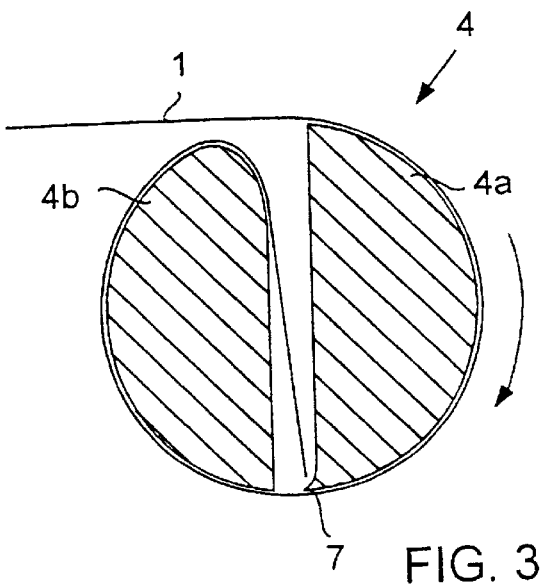
FIG. 3 shows the element of FIG. 2 after the fibre has been cut.

The body of revolution of the arrangement shown in FIGS. 1 to 3 is an essentially cylindrical body with a surface that is preferably made from material that improves the adhesion of the fibre or the like 1. The surface or the entire cylinder can be made, for example, from suitable rubber, plastic or other appropriate material. In the embodiment of FIGS. 1 to 3 the body of revolution is a split cylinder made from rubber material and placed in the desired production line so that the fibre or the like 1 passes between the parts 4a, 4b of the cylinder. As stated above, part 4a has an edge 7 that is so sharp that the optical fibre is cut as the edge turns over the fibre. The cutting process takes place in the manner stated above, i.e. the cylinder is accelerated to rotate so quickly that the circumferential speed of the cylinder corresponds to the linear speed of the fibre or the like and that the rotation is stopped as quickly as possible, i.e. with a quick ramp. An example for the tests conducted is a speed of 2400 rpm, which corresponds to a line speed of 1650 m/min with a full reel. In the tests, the reels endured well a ramp of about one second. Instead of stopping, the cylinder can also be made to reciprocate parallel to its longitudinal axis, whereby the fibre or the like 1 winds on the circumference of the cylinder continuously.

To ensure that the fibre or the like 1 is cut in two, it is possible to arrange a suitable stop piece in front of the cutting edge 7 of the cylinder, whereby the fibre or the like 1 is cut between the cutting edge and the stop piece or stop surface. Since optical glass fibres break when bent with a sufficiently short radius, an actual cutting edge is not necessarily needed.

Figure 4:
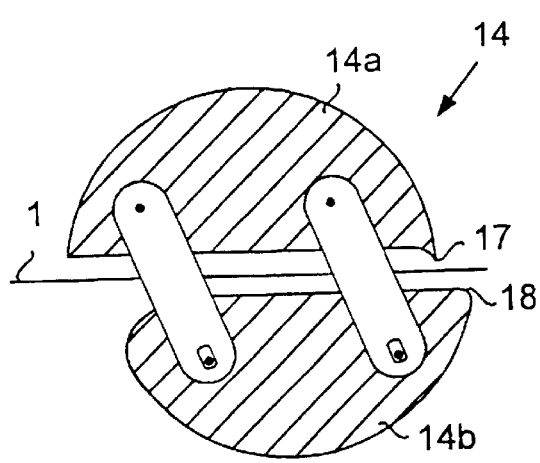
FIG. 4 shows a second embodiment of the essential element of the arrangement according to the invention in a standard situation of the process.
Figure 5:
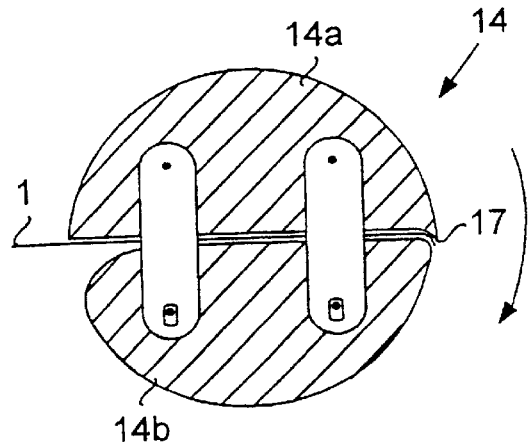
FIG. 5 shows the element of FIG. 4 when the fibre is being cut.

FIGS. 4 and 5 show a second preferred embodiment of the body of revolution 14. The arrangement of FIGS. 4 and 5 consists of two parts 14a, 14b that are arranged to press against each other when the fibre or the like 1 is being cut. FIG. 4 shows the embodiment during the process, and FIG. 5 shows a situation where the fibre or the like 1 is being cut. Parts 14a, 14b can be pressed against each other in any suitable way whatsoever, e.g. by centripetal force, a spring, pneumatic air, etc. In the embodiment of FIGS. 4 and 5 the fibre or the like is cut between the sharp edge 17 and the stop surface 18. The operation corresponds to the operation of the arrangement of FIGS. 1 to 3.

The above embodiments are not to be construed as limiting the invention in any way, but the invention can be varied quite freely within the scope of the claims. It is thus clear that the arrangement of the invention or the details of the arrangement need not necessarily be exactly as shown in the figures but that other kinds of solutions are also possible. The invention can be applied in different processes, e.g. in connection with secondary coating, dyeing of fibres, mechanical testing or automatic double spooling. In addition, the invention can be used in connection with a potential fibre cut to catch the free end of the fibre. Further, the invention is not limited in any way to optical fibres but it can also be applied, for example, in connection with other fibres or fibre bundles.

What is claimed is:

1. Apparatus for use in processing a fibre, the apparatus including control and drawing means for guiding a fibre in a first direction of travel, and means for cutting the fibre, wherein said means comprises a body of revolution consisting of two parts between which the fibre is arranged to pass during processing without contacting said two parts; said body of revolution being arranged to rotate during the cutting of the fibre about an axis that is substantially transverse to said direction of travel of the fibre; and wherein an edge of one part of said body of revolution is sufficiently sharp that when rotation of said body of revolution causes said edge to press against the fibre, said edge cuts the fibre to thereby create a free end of the fibre that winds around a peripheral surface of said body of revolution during rotation thereof.

2. Apparatus according to claim 1, wherein said body of revolution is substantially cylindrical in shape.

3. Apparatus according to claim 1 wherein said two parts of said body of revolution are arranged to press against each other as the fibre is being cut.

4. Apparatus according to claim 1 wherein at least the peripheral surface of said body of revolution is made from material that improves adhesion of the fibre to said body of revolution.

5. Apparatus according to claim 1 wherein as the fibre is being cut, said body of revolution is arranged to be first accelerated to a speed of rotation at which the speed of the peripheral surface of the body of revolution corresponds to speed of motion of the fibre, and then decelerated for stopping so that tension acting in the fibre does not exceed a predetermined tension limit for said fibre.

* * * * *